United States Patent
Shin et al.

(10) Patent No.: US 7,251,505 B2
(45) Date of Patent: Jul. 31, 2007

(54) APPARATUS AND METHOD FOR ALERTING A USER OF INCREASED BATTERY POWER CONSUMPTION IN MOBILE TERMINAL

(75) Inventors: Jae-Wook Shin, Incheon (KR); Ho-Jung Lee, Yongin-si (KR); Yong-Jin Lee, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 335 days.

(21) Appl. No.: 10/946,839

(22) Filed: Sep. 22, 2004

(65) Prior Publication Data
US 2005/0143144 A1 Jun. 30, 2005

(30) Foreign Application Priority Data
Dec. 29, 2003 (KR) ............... 10-2003-0099009

(51) Int. Cl.
*H04B 1/38* (2006.01)
(52) U.S. Cl. .............. 455/567; 455/572; 455/574; 455/456.1
(58) Field of Classification Search .......... 455/567, 455/572, 573, 574, 343.1, 343.2, 343.3, 343.5, 455/456.1, 456.2, 456.3, 456.4, 457, 127.1
See application file for complete search history.

(56) References Cited

U.S. PATENT DOCUMENTS

| | | | | |
|---|---|---|---|---|
| 5,248,929 A | | 9/1993 | Burke | |
| 5,592,173 A | * | 1/1997 | Lau et al. | 455/343.2 |
| 5,627,528 A | * | 5/1997 | Kuznicki | 455/343.5 |
| 5,680,112 A | * | 10/1997 | Xydis | 455/343.2 |
| 6,118,996 A | * | 9/2000 | Kowaguchi et al. | 455/572 |
| 6,313,832 B1 | | 11/2001 | Ishida | |
| 6,393,293 B1 | * | 5/2002 | Saewert et al. | 455/456.1 |
| 6,768,909 B1 | * | 7/2004 | Irvin | 455/456.5 |
| 2001/0034251 A1 | | 10/2001 | Goto | |
| 2003/0153366 A1 | | 8/2003 | Nagata | |

FOREIGN PATENT DOCUMENTS

CN 1070073 3/1993

\* cited by examiner

*Primary Examiner*—Lana Le
(74) *Attorney, Agent, or Firm*—The Farrell Law Firm

(57) ABSTRACT

An apparatus and method for notifying a user if a mobile terminal is located in an area where its power consumption is high is provided. The voltage level of a battery provided to the mobile terminal is detected. If the detected battery voltage level is reduced by at least a predetermined reference value or more for a predetermined period of time, the mobile terminal determines that the mobile terminal is located in an area where power consumption is high, and then informs the user thereof.

10 Claims, 4 Drawing Sheets

APPARATUS AND METHOD FOR ALERTING A USER OF INCREASED BATTERY POWER CONSUMPTION IN MOBILE TERMINAL

PRIORITY

This application claims priority to an application entitled "APPARATUS AND METHOD FOR ALERTING OF BATTERY POWER CONSUMPTION IN MOBILE TERMINAL", filed in the Korean Intellectual Property Office on Dec. 29, 2003 and assigned Ser. No. 2003-99009, the contents of which are incorporated herein by reference.

BACKGROUND OF THE INVENTION

1. Field of the Invention

The present invention relates to an apparatus and method for checking battery power consumption, and more particularly to an apparatus and method for informing a mobile terminal user that he/she entered a location where power consumption of the mobile terminal is high.

2. Description of the Related Art

Saving battery power is very important to mobile terminal users. An important development in mobile terminal technology was to provide an indicator or icon to display the remaining battery level of a battery of a mobile terminal. A general method for displaying the remaining battery level of a mobile terminal is to schematically display battery voltage level on a display of the terminal and alert the user of a low battery level with a beeping or buzzing sound if the remaining battery level is reduced below a predetermined level. However, the conventional battery level display method simply displays the remaining battery level, and cannot inform the user of an amount current battery power being consumed by the terminal during the use of certain functions of the mobile terminal.

A description will now be given of how the conventional terminal displays battery power level with reference to FIG. 2, which is a flow chart showing a conventional method for informing a user of battery power consumption of a mobile terminal. First, if a mobile terminal is powered on at step 200, the procedure moves to step 202 to detect the battery voltage level of the terminal. Then, at step 204, it is determined if the battery voltage level has been detected a predetermined number of times. If the battery voltage level has been detected the predetermined number of times, the procedure moves to step 206 to calculate an average of the detected battery voltage levels. If not, the procedure returns to step 202. At step 208, the procedure compares the average voltage level calculated at step 206 with a previously stored average voltage level. If the average voltage level calculated at step 206 is equal to the previously stored average voltage level, the procedure moves to step 202 to redetect the battery voltage level. On the other hand, if the average voltage level calculated at step 206 is lower than the previously stored average voltage level, the calculated average voltage level is displayed at step 210.

As described above, in the conventional method, the mobile terminal cannot inform the user if it is located in an area where its power consumption is high, but simply displays the remaining battery voltage level. The conventional mobile terminal has high power consumption if it is located in a dead zone or a weak signal strength area where it is difficult to receive radio signals. However, if the user uses the terminal without knowing that it is located in such a high power consumption area, the battery time is reduced, compared to when the terminal is located in an area where it receives normal radio signals. For this reason, the user needs to be informed of whether the mobile terminal is currently located in a high power consumption area.

As described above, in the prior art, even when the mobile terminal is located in an area where the battery power consumption is rapidly varying, the terminal cannot provide the user with any information as to whether it is located in such an area. The user may continue to use the terminal without being aware of such a situation, with the result that battery power is rapidly consumed.

SUMMARY OF THE INVENTION

Therefore, the present invention has been made in view of the above problem, and it is an object of the present invention to provide an apparatus and method for alerting a mobile terminal user that their battery power is being rapidly consumed, so as to allow the user to more efficiently use the battery.

In accordance with one aspect of the present invention, the above and other objects can be accomplished by the provision of an apparatus for alerting a user of battery power consumption in a mobile terminal which includes a battery voltage detector for detecting a battery voltage level of the mobile terminal; and a controller for notifying the user that the mobile terminal is located in an area where power consumption of the terminal is high if the detected battery voltage level is reduced by a predetermined reference battery voltage variation value or for more than a predetermined period of time.

In accordance with another aspect of the present invention, there is provided a method for alerting a user of high battery power consumption of a mobile terminal which includes the steps of detecting a battery voltage level of the mobile terminal, and detecting that the mobile terminal is located in an area where power consumption of the terminal is high if the detected battery voltage level is reduced by a predetermined reference battery voltage variation value or for more than a predetermined period of time; and informing the user that the mobile terminal is located in an area where the power consumption is high, if it is detected that the mobile terminal is located in an area where power consumption is high.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the drawings. In the following description, a detailed description of known functions and configurations incorporated herein will be omitted when it may make the subject matter of the present invention unclear.

According to the present invention, a mobile terminal user is informed as to whether the mobile terminal is in an area where battery power of the terminal is rapidly consumed, so that the user can efficiently use the battery. The internal configuration of a mobile terminal to which the present invention is applied for informing a user as to whether the user is located in an area where battery power of the terminal is rapidly consumed will now be described with reference to FIG. 1.

Figure 1:
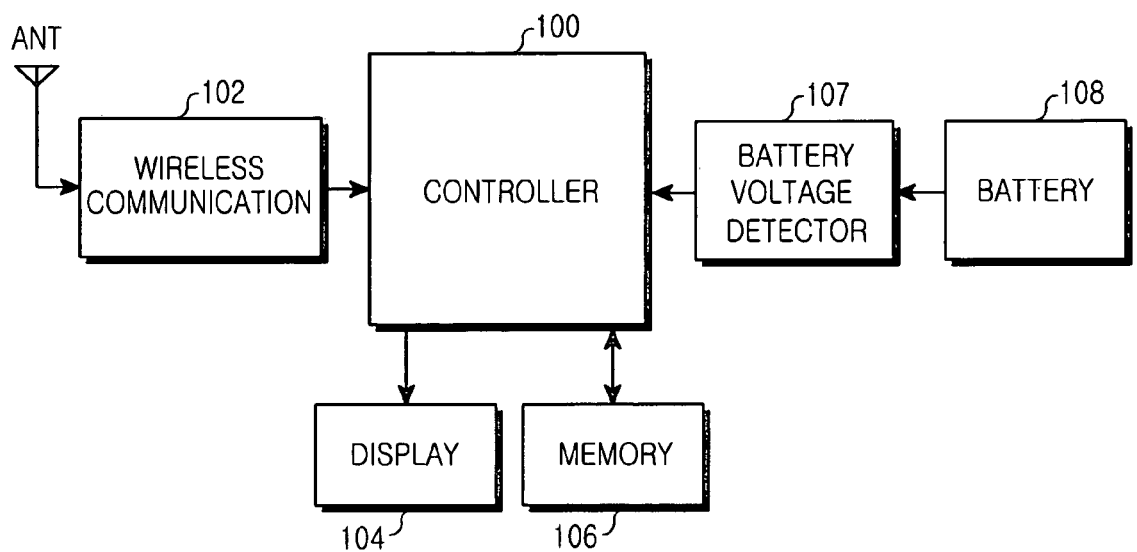
FIG. 1 is a block diagram showing the configuration of a mobile terminal to which the present invention is applied.
Figure 2:
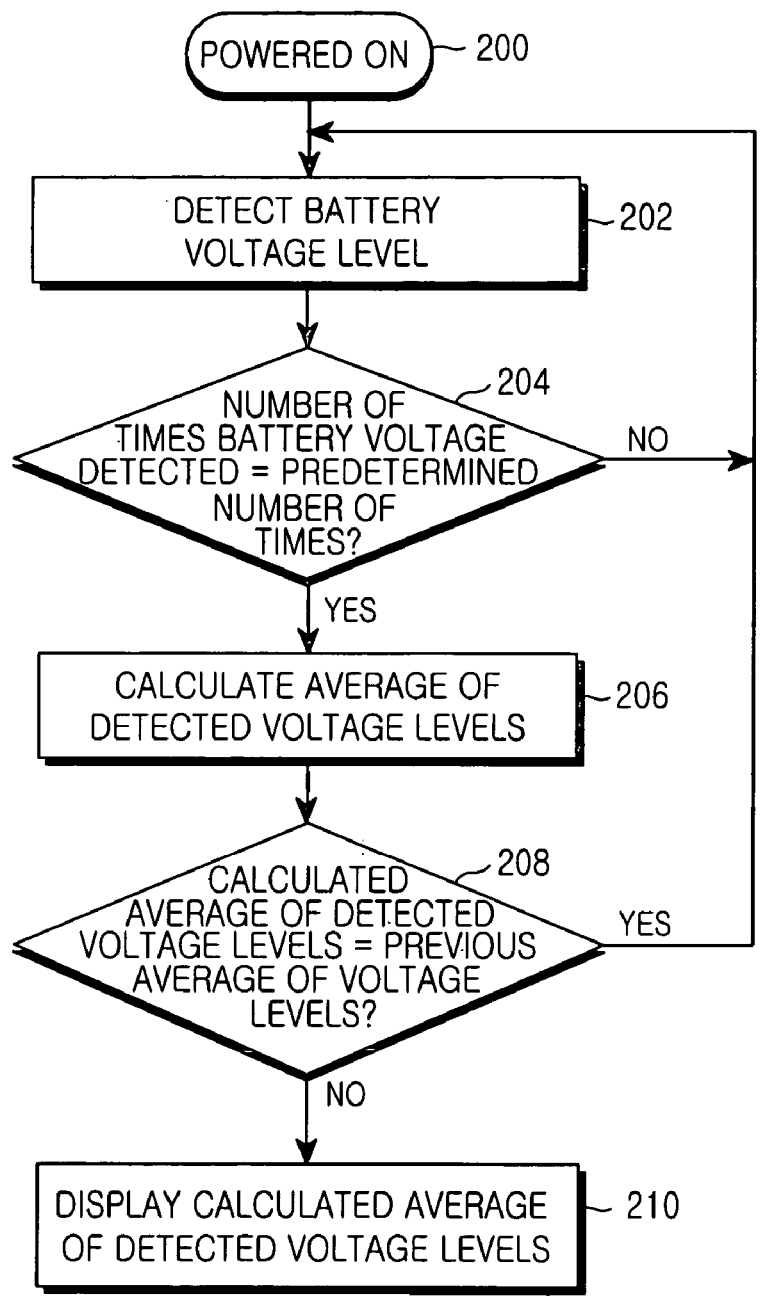
FIG. 2 is a flow chart showing a conventional method for notifying a user of battery power consumption in a mobile terminal.

As shown in FIG. 1, the mobile terminal includes a controller 100, a wireless communication module 102, a display unit 104, a memory 106, a battery voltage detector 107, a battery 108 and an antenna ANT. The controller 100 controls the overall operation of the mobile terminal. In particular, according to the present invention, the controller 100 functions to detect whether the mobile terminal is located in an area where its power consumption is high and then informs the user of this condition. To accomplish this, the controller 100 detects the voltage level of the battery 108 via the battery voltage detector 107 a predetermined number of times, and calculates an average of the detected battery voltage levels. The controller 100 calculates the difference between the calculated average battery voltage level and a previous average battery voltage level. If the calculated difference is equal to or higher than a predetermined reference battery voltage variation value, the controller 100 increases a high power consumption detection count by one. If the high power consumption detection count is equal to or higher than a reference count, the controller 100 detects that the mobile terminal is located in an area where power consumption of the battery is high. If it is detected that the mobile terminal is located in an area where power consumption of the battery is high, since the high power consumption detection count is equal to or higher than the reference count, the controller 100 informs the user by vibrating the terminal, generating a bell sound or displaying, on the terminal's screen, that the battery power consumption is high. A combination of any or all of the vibration, the bell sound and the displaying on the screen may be used to inform the user that the battery power consumption is high.

If a frequency signal is received through the antenna ANT over a wireless channel of a frequency band, the wireless communication module 102 down-converts the received frequency signal and outputs the down-converted signal to the controller 100 after discriminating the type of data of the signal. The data output from the wireless communication module 102 to the controller 100 may be text data, or may also be signaling or paging signals received through a paging channel. The display unit 104 displays image information on a screen thereof under the control of the controller 100, and displays a changed battery voltage level from the controller 100. The memory 106 stores, permanently or temporarily, stores a program for operating the mobile terminal, and also stores a plurality of data required when the mobile terminal is in operation. In particular, according to the present invention, the memory 106 stores a program for determining if the terminal is located in an area where power consumption of the battery is high.

Figure 3:
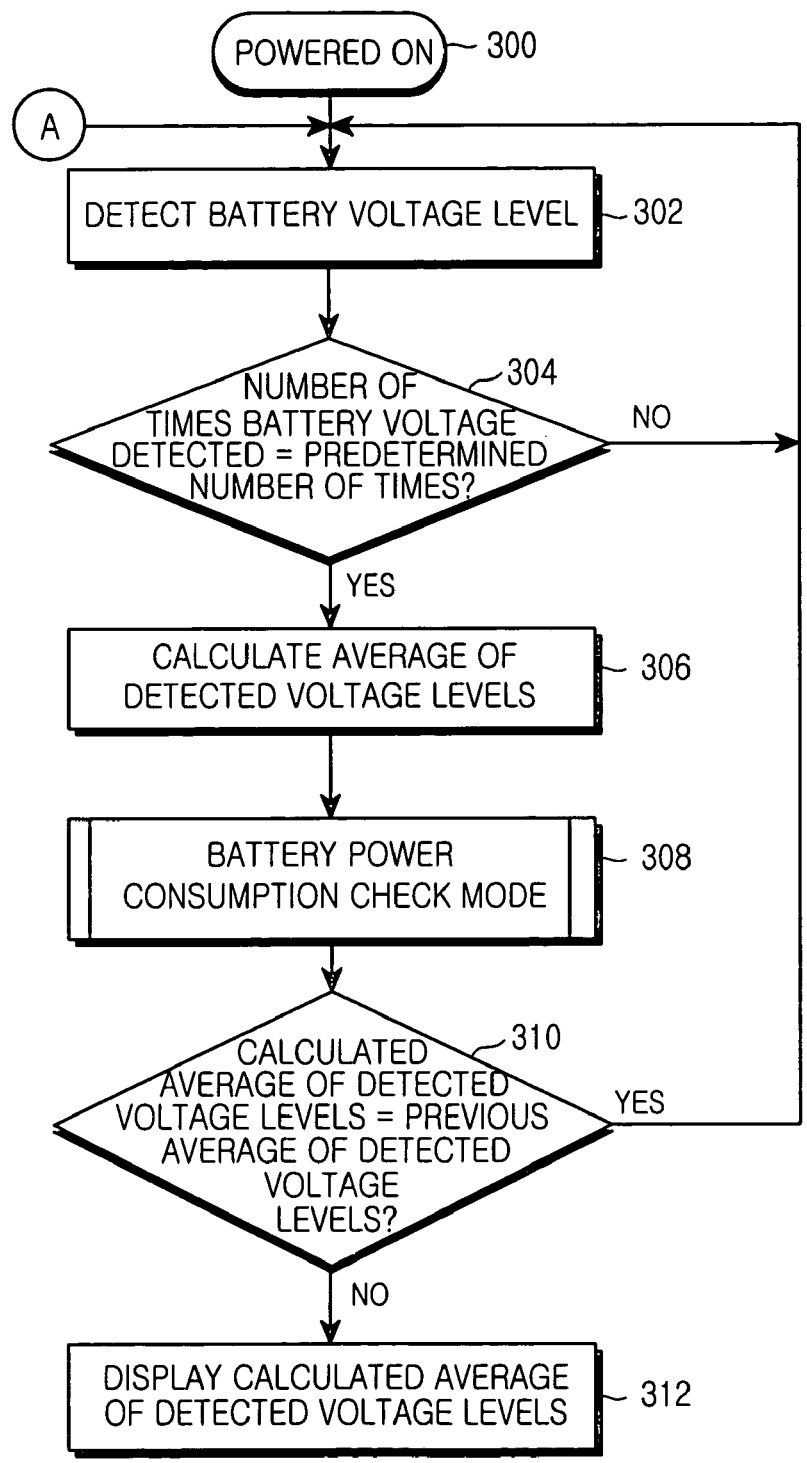
FIG. 3 is a flow chart showing a method for notifying a user of battery power consumption in a mobile terminal according to an embodiment of the present invention.
Figure 4:
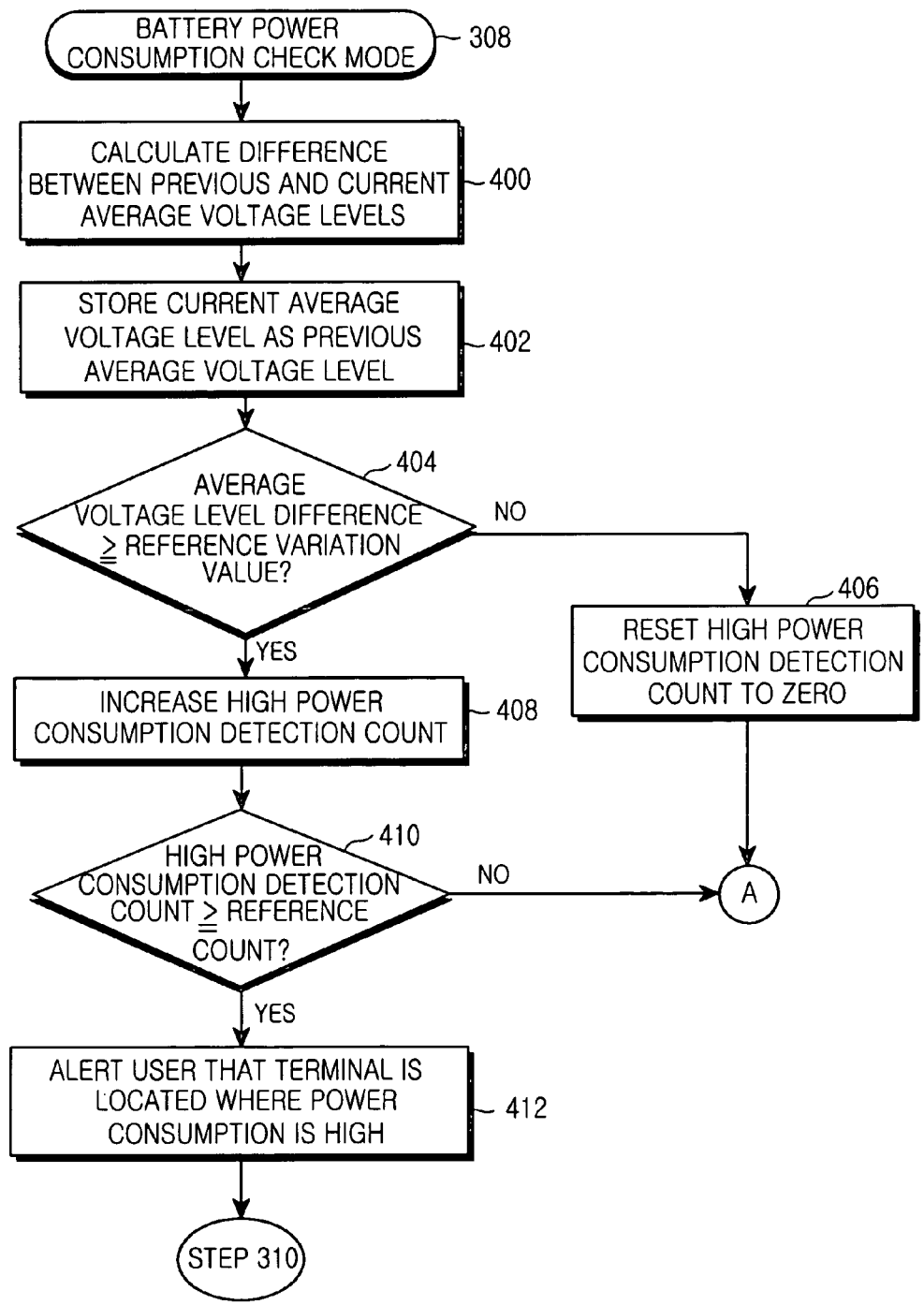
FIG. 4 is a flow chart showing a method for operating a mobile terminal in a battery power consumption check mode according to the embodiment of the present invention.

A method for informing a mobile terminal user as to whether the mobile terminal is located in an area where battery power of the terminal is rapidly consumed will now be described with reference to FIGS. 3 and 4. FIG. 3 is a flow chart showing a method for informing the user of battery power consumption of the mobile terminal according to an embodiment of the present invention, and FIG. 4 is a flow chart showing a method for performing a battery power consumption check mode in a mobile terminal according to the embodiment of the present invention.

As shown in FIG. 3, if the mobile terminal is powered on at step 300, the procedure moves to step 302 to detect a battery voltage level. Then, at step 304, the battery voltage level is checked to determine if the battery voltage level has been detected a predetermined number of times. At step 306, the average of the detected battery voltage levels is calculated, and the average is stored. Then the procedure moves to step 308 to activate a battery power consumption check mode to determine if the terminal is located in an area where the battery power is rapidly consumed.

The method for performing the battery power consumption check mode will now be described with reference to FIG. 4. Once the battery power consumption check mode is activated at step 308, the procedure moves to step 400 to calculate the difference between the currently calculated average of battery voltage levels and a previous average of battery voltage levels. At step 402, the currently calculated average of battery voltage levels is stored as a previous average of battery voltage levels. Then, the procedure moves to step 404 to check whether the calculated difference of the current and previous averages of battery voltage levels is equal to or greater than a predetermined reference battery voltage variation value. If the calculated difference is equal to or greater than the predetermined reference battery voltage variation value, the procedure moves to step 408 to increase a high power consumption detection count by one. Thereafter, the procedure moves to step 410 to check whether the high power consumption detection count is equal to or greater than a reference count. If the high power consumption detection count is equal to or greater than the reference count, the procedure moves to step 412 to notify the user that the mobile terminal is located in an area where the power consumption is high, and then moves to step 310 of FIG. 3. Here, the notification that the mobile terminal is located in an area where the power consumption is high is performed by vibrating the terminal, generating a bell sound or displaying, on the terminal's screen, an indication that the battery power consumption is high. The notification may also be performed via any combination of the vibration or bell sound with the displaying, on the screen, that the battery power consumption is high. If the result at step 410 is that the high power consumption detection count is lower than the reference count, the procedure returns to step 302.

On the other hand, if the result at step 404 is that the calculated difference of the current and previous averages of battery voltage levels is lower than the predetermined reference battery voltage variation value, the procedure moves to step 406 to reset the high power consumption detection count to zero, and then returns to step 302.

As is apparent from the above description, the present invention provides a method and apparatus for alerting a user of high battery power consumption of a mobile terminal. If battery voltage level of the mobile terminal is reduced by at least a predetermined reference battery voltage variation value for a predetermined period of time, the mobile terminal notifies the user that the terminal is located in an area where power consumption is high. This notification of high power consumption allows the user to manage the battery of the mobile terminal more efficiently.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for alerting a user of battery power consumption in a mobile terminal, the apparatus comprising:
   a battery voltage detector for detecting a voltage level of a battery of the mobile terminal; and
   a controller for notifying the user that the mobile terminal is located in an area where power consumption of the terminal is high if the detected battery voltage level is reduced by a predetermined reference battery voltage variation value.

2. The apparatus according to claim 1, wherein if the power consumption of the battery for a predetermined period of time is equal to or greater than power consumption corresponding to the predetermined reference battery voltage variation value, the controller detects that the mobile terminal is currently located in an area where power consumption is high.

3. The apparatus according to claim 1, wherein the controller informs the user that the mobile terminal is currently located in an area where power consumption is high, by at least one of vibration of the terminal, generation of a bell sound and displaying, on a screen of the mobile terminal, that battery consumption is high.

4. The apparatus according to claim 1, wherein the controller informs the user that the mobile terminal is currently located in an area where the power consumption is high, by a combination of vibration of the terminal with displaying, on the terminal's screen, that battery consumption is high.

5. The apparatus according to claim 1, wherein the controller informs the user that the mobile terminal is currently located in an area where power consumption is high, via a combination of generation of a bell sound with displaying, on a screen of the terminal, that battery consumption is high.

6. A method for alerting a user of high battery power consumption of a mobile terminal, the method comprising the steps of:
   a) detecting a voltage level of a battery of the mobile terminal,
   b) determining if the detected battery voltage level is reduced by at least a predetermined reference battery voltage variation value or more for a predetermined period of time; and
   c) informing the user that the mobile terminal is located in an area where the power consumption is high, if it is determined that battery voltage level is reduced in step b).

7. The method according to claim 6, wherein step b) includes the steps of:
   b-1) detecting the voltage level of the battery of the mobile terminal a predetermined number of times, and then calculating an average of the detected battery voltage levels;
   b-2) calculating a difference between the calculated average of the detected battery voltage levels and a previous average of detected battery voltage levels;
   b-3) increasing a high power consumption detection count if the calculated difference is equal to or greater than the predetermined reference battery voltage variation value; and
   b-4) detecting that the mobile terminal is located in an area where the power consumption is high, if the high power consumption detection count is equal to or greater than a reference count.

8. The method according to claim 6, wherein step c) includes the steps of detecting that the mobile terminal is currently located in an area where the power consumption is high, and informing the user that the mobile terminal is currently located in an area where the power consumption is high, by at least one of vibration of the terminal, generation of a bell sound and displaying, on a screen of the terminal, that battery consumption is high.

9. The method according to claim 6, wherein step c) includes the steps of detecting that the mobile terminal is currently located in an area where the power consumption is high, and informing the user that the mobile terminal is currently located in an area where the power consumption is high, by a combination of vibration of the terminal with displaying, on a screen of the terminal, that battery consumption is high.

10. The method according to claim 6, wherein step c) includes the steps of detecting that the mobile terminal is currently located in an area where the power consumption is high, and informing the user that the mobile terminal is currently located in an area where the power consumption is high, by a combination of generation of a bell sound with displaying, on a screen of the terminal, that battery consumption is high.

* * * * *